(12) United States Patent
Ryu

(10) Patent No.: US 6,453,414 B1
(45) Date of Patent: Sep. 17, 2002

(54) COMPUTER SYSTEM WITH PC CARDS AND METHOD OF BOOTING THE SAME

(75) Inventor: Chang-Hyun Ryu, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/360,113

(22) Filed: Jul. 23, 1999

(30) Foreign Application Priority Data

Jul. 23, 1998 (KR) ............................................. 98-29725

(51) Int. Cl.[7] ................................................ G06F 9/445
(52) U.S. Cl. ......................................................... 713/2
(58) Field of Search ........................................ 715/1, 2

(56) References Cited

U.S. PATENT DOCUMENTS

| 5,359,182 A | 10/1994 | Schilling |
| 5,664,228 A | 9/1997 | Mital |
| 5,687,346 A | 11/1997 | Shinohara |
| 5,719,387 A | 2/1998 | Fujioka |
| 5,778,195 A | 7/1998 | Gochi |
| 5,814,798 A | 9/1998 | Zancho |
| 5,818,029 A | 10/1998 | Thomson |
| 5,836,010 A | 11/1998 | Kim |
| 5,845,114 A | 12/1998 | Cloud |
| 5,877,483 A | 3/1999 | Bilich et al. |
| 5,877,488 A | 3/1999 | Klatt et al. |
| 5,887,118 A | 3/1999 | Huffman et al. |
| 5,889,941 A | 3/1999 | Tushie et al. |
| 5,898,869 A | 4/1999 | Anderson |
| 5,905,253 A | 5/1999 | Ito et al. |
| 5,907,616 A | 5/1999 | Brögger et al. |
| 5,935,228 A | * | 8/1999 | Shinomura .................. 710/102 |
| 6,032,255 A | * | 2/2000 | Shim et al. ..................... 713/2 |

* cited by examiner

*Primary Examiner*—Thomas M. Heckler
(74) *Attorney, Agent, or Firm*—Robert E. Bushnell, Esq.

(57) ABSTRACT

A computer system with a PC card and a booting method of the same is described and which includes bootable configuration by loading a boot record from a nonvolatile memory of the PC card. If the PC card is installed in a personal computer memory card international association(PCMCIA) adapter, the computer system loads a boot record from the PC card to a memory and performs system booting, then. As a result, when a plurality of users use a computer, system environments required by the user are loaded from a PC card, thereby conveniently setting a system environment. Moreover, the boot record is loaded from the PC card, the system booting is performed to have a system security function.

4 Claims, 4 Drawing Sheets

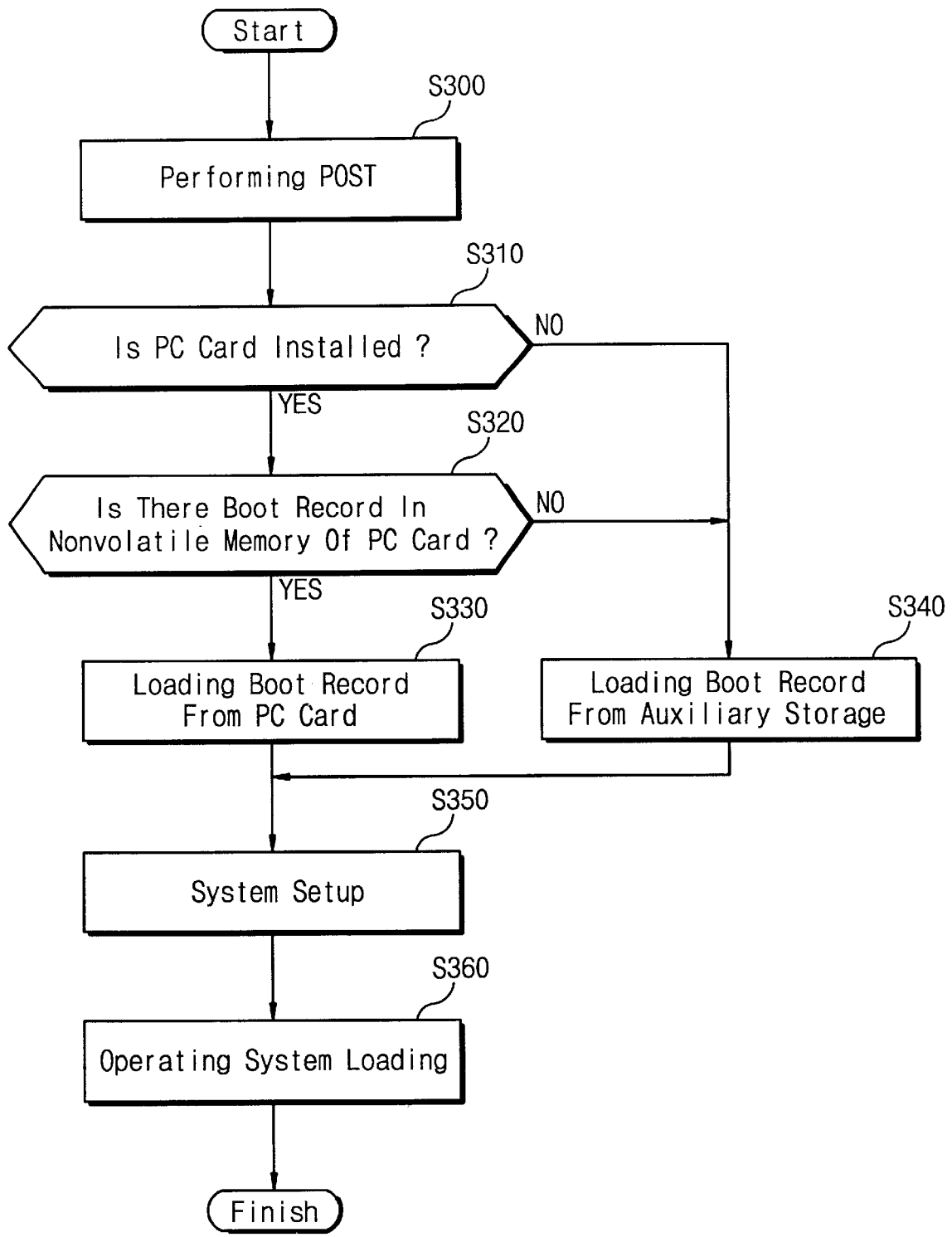

COMPUTER SYSTEM WITH PC CARDS AND METHOD OF BOOTING THE SAME

CLAIM OF PRIORITY

This application makes reference to, incorporates the same herein, and claims all benefits accruing under 35 U.S.C. §119 from an application for Computer System With PC Cards and Method of Booting the Same earlier filed in the Korean Industrial Property Office on Jul. 23, 1998 and there duly assigned Ser. No. 29725/1998.

FIELD OF THE INVENTION

The present invention relates to computer systems, and more particularly to computer systems with PC cards and method of booting the same.

DESCRIPTION OF THE RELATED ART

Smart cards, personal computer memory card international association (PCMCIA) cards, credit/debit cards and integrated circuit cards are becoming popular in their use with telephones. Personal organizers, personal computers and notebook computers. U.S. Pat. No. 5,814,798 for a Method and Apparatus For Personal Attribute Selection and Management Using Prediction to Zancho discloses a portable donor device that contains user preferences to be used with various electronic equipment. U.S. Pat. No. 5,898,869 for a Method and System for PCMCIA Card Boot from Dual-Ported Memory to Anderson discloses using a PCMCIA card to boot a computer. U.S. Pat. No. 5,877,483 for a Method and Apparatus for Automatically Implementing Computer Power On and Logon Functions using Encoded ID Card to Bilich et al discloses a card that contains user ID and security code for access to a host personal computer. What is needed is a PCMCIA card that can boot a system, check user ID and password, and set the system environment for a host notebook computer with use of a single card.

SUMMARY OF THE INVENTION

In order to remedy the drawbacks of earlier computer systems, the present invention is aimed at providing a method for booting a computer system by setting an environment fitted for each of users.

It is also an object of the present invention to provide a method and apparatus using a PCMCIA card to boot a host computer, set the environment for a host computer, and to check user ID and password for a host computer.

It is further an object to provide a PC card system for a computer that allows a plurality of users, each with their own environment, to easily use the computer as each user will have their own PC card having their own personal preferences stored on the PC card.

According to the present invention, a computer system comprises a system processor, a memory electrically connected with the system processor, a BIOS (basic input/output system), a PCMCIA (personal computer memory card international association) adapter, and a PC card connected with the computer system through the PCMCIA adapter. Here, the PC card includes a nonvolatile memory and a boot record included in the nonvolatile memory and having a data segment storing hardware configuration of the computer system, and an executable code segment. Here, the BIOS initializes the computer system and loads the boot record from the PC card to the memory.

In the preferred embodiment of the invention, the boot record includes a system file for setting initial conditions of the computer system and a user identification code.

According to the present invention, a method for booting a computer system with a PC card comprises the steps of discriminating whether the PC card is installed in the computer system, discriminating whether a boot record is included in a nonvolatile memory of the PC card, if the PC card is installed therein, and setting a system environment with reference to the boot record, if there is the boot record in the PC card.

In the preferred embodiment of the invention, the method further comprises the steps of discriminating whether a user identification code is stored in the nonvolatile memory of the PC card, if the PC card is installed in the computer system and replacing user password input as the user identification code, if the user identification code is stored in the PC card.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a flow chart illustrating the steps of the program operation executed in a computer system according to the present invention.

DETAILED DESCRIPTION OF THE INVENTION

Figure 1:
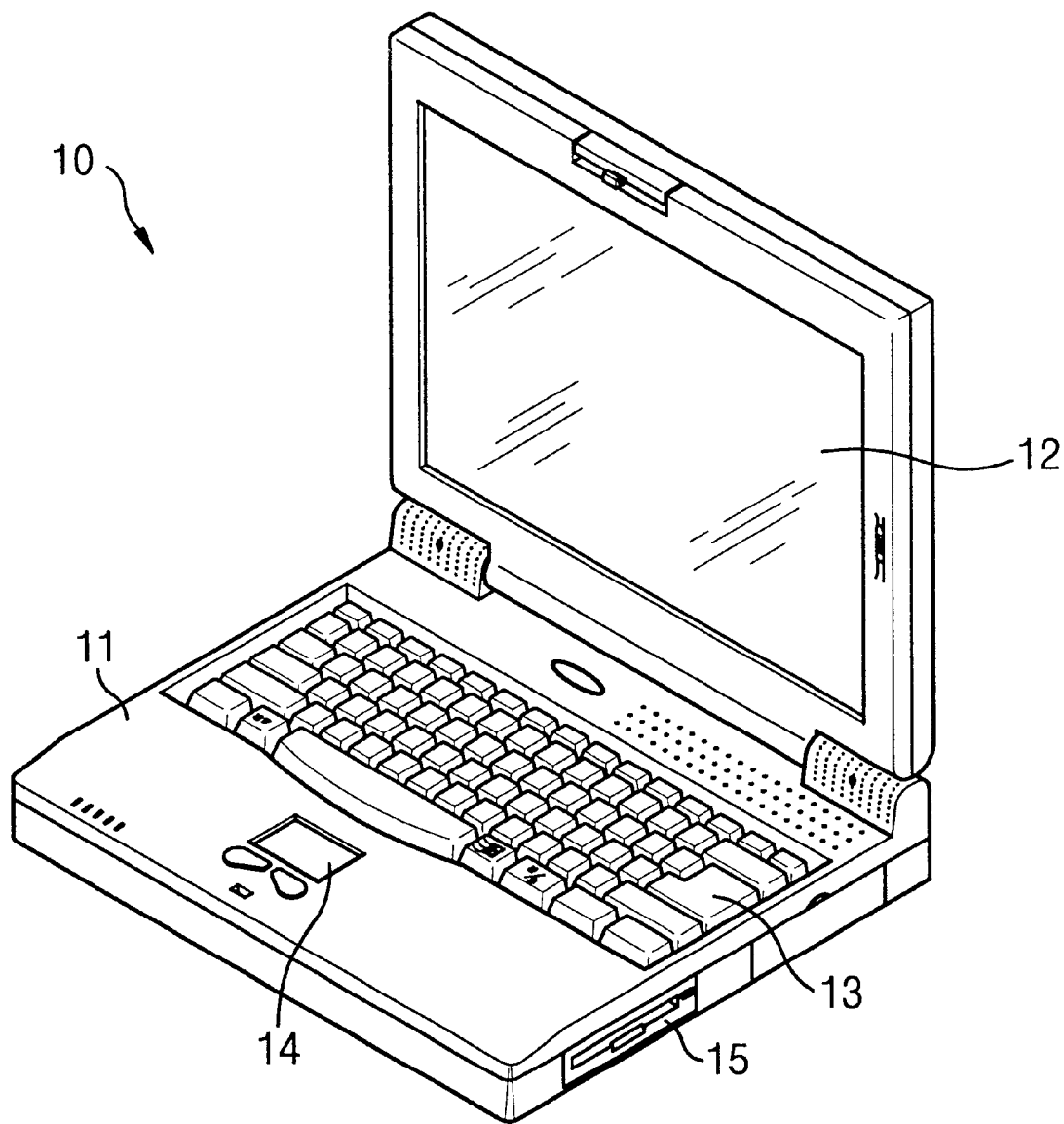
FIG. 1 is a perspective view illustrating an exterior view of an earlier portable computer system.

FIG. 1 depicts a portable computer system. Referring to FIG. 1, the portable computer system 10 includes a computer body 11, a display device 12, a keyboard 30, and a touch pad 14. A floppy disk drive (FDD) 15 is installed in the computer body 11. Further, additional output devices (not shown), such as a printer and a plotter, and additional input devices (not shown), such as a joystick and a light pen, may be included in the portable computer system 10.

The computer system 10 may include a system processor (i.e., CPU), one or more dynamic random access memory (DRAM) devices used main memories, one or more read only memory (ROM) devices, a hard disk drive (HDD) used as a mass storage, and at least one floppy disk drive (FDD). One of the ROM devices may include a basic input/output system (BIOS) for driving input/output peripheral devices. The BIOS will initialize the system processor, and read and store a master boot record from the HDD and into the DRAM devices. The master boot record is typically placed on track 0 of sector 0 of a disk in the HDD, which loads an operating system (OS) to the DRAM devices from the HDD or FDD.

As is well known, the OS is a set of programs which are disposed between computer hardware components and a user application program, and allows the application program to easily use the hardware components, and manages resources of both the hardware and software components in order to maximize efficiency of the entire system.

A computer user generally sets the environment of a computer system at his desire by changing system files such as 'config.sys' and 'autoexec.bat' files, so that the system environment is automatically set during initial booting of the computer system. If, however, the user resets the system files, the system should be rebooted.

Moreover, in the event the computer system is provided for multiple users in respective different environments, each of the users should set his own environment and reboot the computer system whenever he wants to perform a task with the computer system.

The present invention relates to a computer system that a PC card can be installed and a method for booting the same, which has bootable configuration by loading a boot record from a nonvolatile memory of the PC card. If the PC card is installed in a PCMCIA (personal computer memory card international association) adapter, the computer system is booted by loading the boot record from the PC card to a memory. Therefore, when a plurality of users use a computer system, a system environment that each of users requires is conveniently set by loading the system environment from the PC card. Further, the system is booted by loading the boot record from the PC card, so that the system has a security function.

Figure 2:
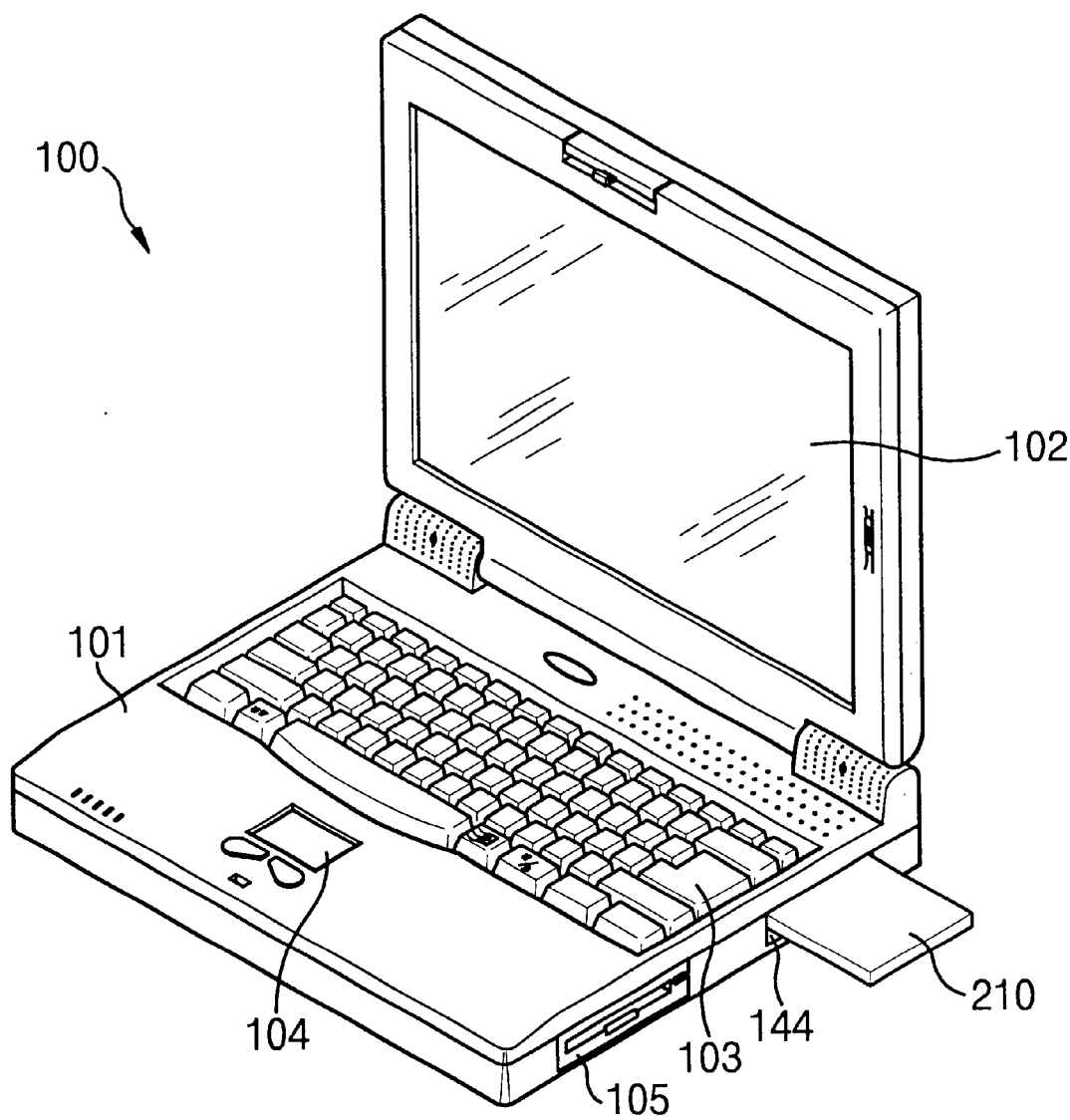
FIG. 2 is a perspective view illustrating an exterior view of a portable computer system with a PC card according to the present invention.

FIG. 2 depicts a portable computer with a PC card according to the preferred embodiment of the invention. As shown in FIG. 2, the portable computer 100 becomes small and light compared with a desk-top computer, so that it can be used with portability. However, an internal space of the portable computer 100 is limited to restrict the number of extension devices which can be installed into a system bus slot. Moreover, it is not easy for a user (who is a non-expert) to insert a printed circuit board (PCB) into a system bus slot or to remove the PCB.

A PCMCIA is made for compatibility of a computer with an IC card used in electronic machinery. The PCMCIA establishes physical, electrical, and software standard for a memory and an I/O IC card, and is widely used from a camcorder to a desk-top computer, owing to flexibility thereof. A PCMCIA standard-abiding card is generally called a PC card or a PCMCIA card.

The PC card is as large as a credit card and has a 68 pin-connector at one side. Three types of the PC card are provided in a PCMCIA standard 2.1 and definite difference thereof is each thickness. In general, a Type I card is a memory card and a Type II card is the I/O card such as modem or LAN (local area network) card, SCSI (small computer system interface) card, and sound card. A Type III card is applied to an ATA hard disk drive or a large-sized I/O card. Since the PC card is an important extending means, the portable computer makers basically install the PCMCIA adapter and peripheral device manufacturing companies turn out many kinds of PC cards. The PCMCIA adapter includes a socket capable of installing the PCMCIA card (or PC card) and is controlled by the interface of a software executed in the portable computer 100.

Referring to FIG. 2 again, the portable computer 100 comprises a PCMCIA socket 144 at the left side of a housing so as to install a PC card 210. According to the preferred embodiment, the PC card 210 stores the boot record, system files for setting the system environment, a user identification code, etc. in a nonvolatile RAM of the PC card 210.

Figure 3:
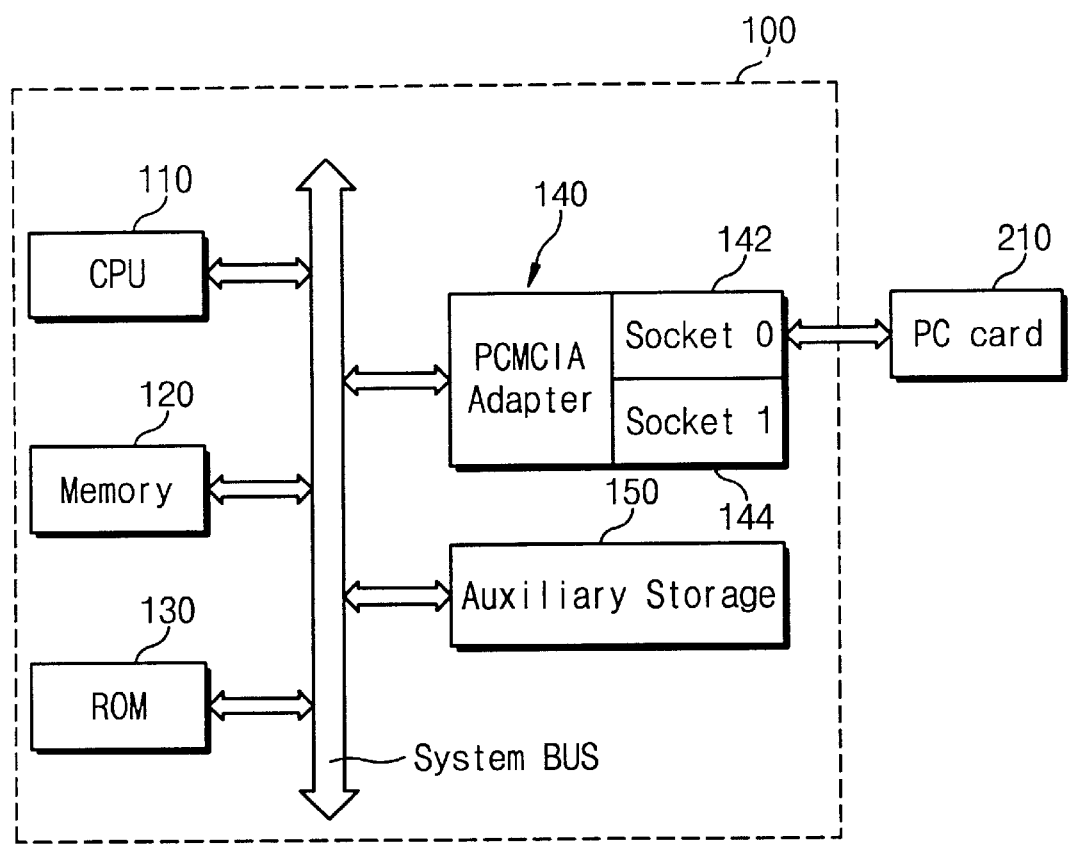
FIG. 3 is a block diagram illustrating internal circuit configuration of a portable computer system illustrated in FIG. 2.

FIG. 3 depicts internal circuit configuration of a portable computer system illustrated in FIG. 2. Referring to FIG. 3, a CPU (central processing unit) 110 is connected with a system bus so as to perform data processing function. A main memory 120 of a computer system and a BIOS (basic input/output system) 130 for driving input/output peripheral devices of the computer system are connected with the system bus. Further, an auxiliary storage 150 for storing lots of data which cannot be stored in the memory 120, is connected with the system bus. The auxiliary storage 150 is, for example, a hard disk, a floppy disk, a magnetic disk, and an optical disk.

In general, two sockets 142 and 144 are included in a PCMCIA adapter 140 connected with the system bus. A PC card is inserted into the sockets 142 and 144, respectively. In the preferred embodiment, the PC card 210 is inserted into the socket 0 142. The portable computer 100 has a 'plug and play' function making operate the PC card 210 instantly, when the PC card 210 is inserted to the sockets 142 and 144. In order to have the 'plug and play' function, the adapter 140 may go through several steps of software and hardware.

Continuously, a driving driver performs socket service and card service so as to use a PC card. The driving driver is a kind of a RAM (random access memory) resident program and is stored in the BIOS 130. The socket service is to control a lowermost layer of a PC card source and supports the same standard (that is, PCMCIA standard), despite sockets of different makers. The card service is to manage system source and supplies the right of detecting collision with input/output address and IRQ (interrupt request) of other devices, and using the PC card. Although an enabler is not defined in the PCMCIA standard, it is significant to not only the card service but also the 'plug and play' function. For example, if a modem is connected, the enabler controls the PC card by means of a set point assigned by the card service. That is, the enabler supplies the usable source received from the card service with application program which is practically used.

Following is the description of operation of a BIOS stored in a ROM (read only memory) 130 during a booting operation of a computer system. If the operation of the system 100 is started, the BIOS stored therein is loaded to the memory 120. This is called a shadow mask, which increases the speed because access speed of the RAM is higher than that of the ROM.

When a process of POST (power on self test) is performed, the BIOS 130 checks the system 100 and loads a boot record to the memory 120. The boot record is composed of a data segment and an executable code segment. A boot record of an auxiliary storage device 150 such as a hard disk and a floppy disk is loaded in a conventional computer system. However, if a PC card 210 is installed in the PCMCIA adapter 140, the BIOS 130 of this invention can load the boot record from the PC card 210. A method for booting the computer system will be described in detail with reference to FIG. 4.

FIG. 4 depicts the steps of the program operation executed in a computer system according to the present invention. If the computer system 100 is powered on, the process of the POST is performed in step S300. The process thereof initializes the system and tests each devices.

In step S310, it is determined whether the PC card 210 is installed in the PCMCIA adapter 140. That is, it is discriminated whether there is a PC card connected with the socket 0 142 or the socket 1 144. If connected, the control flow proceeds to a next query step S320. If not connected, the control flow proceeds to step S340.

At step S320, it is determined whether a boot record is stored in a nonvolatile memory of the PC card 210. The boot record includes a data segment storing hardware configuration of the computer system and an executable code segment. The nonvolatile memory includes system files (for example, 'config.sys' and 'autoexec.bat') for setting initial conditions of a system and a user identification code. The user identification code includes a user ID and a user password.

If it is sensed that there is the user identification code in the PC card 210, the BIOS 130 stored in the ROM 130 skips the input process of the user password stored in a complementary metal oxide semiconductor (CMOS) RAM (not shown). This means that the PC card 210 can be used as the user identification card. If the boot record is stored in the nonvolatile memory of the PC card 210 connected with the adapter 140, the control flow proceeds to step S330. If the boot record is not stored therein, the control flow proceeds to step S340.

At step S330, the boot record is loaded from a memory of the PC card to the main memory 120 of the portable computer 100. At step S340, the system file is loaded from the auxiliary storage 150 to the main memory 120 thereof. That is, if the PC card 210 is not installed or there is not the boot record in the nonvolatile memory of the PC card 210, the system file is loaded from the auxiliary storage 150 such as floppy disk to the memory 120 thereof.

At step S350, system setup which sets a system environment with reference to the boot record is performed. If there is the user identification code such as the user ID and the user password in the PC card 210, although the password is set in the CMOS RAM (not shown), the user identification code is sensed without receiving the password input from the user. That is, a user having a right to use a computer only possesses the PC card 210, so that a user having no right cannot use the system.

At step S360, an operating system (OS) is loaded from the auxiliary storage 150, so that the user can use the application program.

As mentioned above, if the PC card 210 is installed in the PCMCIA adapter 140, the computer system of this invention loads the boot record from the PC card 210 to the memory 120, thereby performing the system booting.

As a result, when a plurality of users use a computer, system environments required by the user are loaded from a PC card, thereby conveniently setting a system environment. Moreover, the boot record is loaded from the PC card, the system booting is performed to have a system security function.

The present invention has been particularly shown and described with respect to certain preferred embodiments and features thereof. However, it should be readily apparent to those skilled in the art that various changes and modifications in form and detail may be made without departing from the spirit and scope of the invention as set forth in the appended claims. The invention illustratively disclosed herein may be practiced without any element which is not specifically disclosed herein.

What is claimed is:

1. A personal computer memory card international association (PCMCIA) card for a notebook computer system, said PCMCIA card comprises:

a nonvolatile memory;

a boot record stored in said nonvolatile memory;

a system file for setting initial conditions for said notebook computer in said nonvolatile memory;

a file for setting the personal preferences or environment for said notebook computer in said nonvolatile memory; and a user identification and a user password stored in said nonvolatile memory.

2. The PCMCIA card of claim 1, wherein said boot record comprises:

a data segment storing hardware configuration of said notebook computer system; and an executable code segment.

3. A method for booting a computer system with a PC card, comprising the steps of: determining whether said PC card is installed in said computer system;

determining whether a boot record is included in a nonvolatile memory of said PC card, when said PC card is installed therein; and setting a system environment with reference to said boot record, when there is said boot record in said PC card.

4. The method of claim 3, wherein said method further comprises the steps of:

determining whether a user identification code is stored in said nonvolatile memory of said PC card, when said PC card is installed in said computer system; and replacing user password input as said user identification code, when said user identification code is stored in said PC card.

\* \* \* \* \*